United States Patent [19]
Bodony

[11] 3,932,704
[45] Jan. 13, 1976

[54] COHERENT DIGITAL FREQUENCY SHIFT KEYING SYSTEM

[75] Inventor: Andrew B. Bodony, Westbury, N.Y.

[73] Assignee: Coherent Communications System Corporation, Central Islip, N.Y.

[22] Filed: Aug. 19, 1970

[21] Appl. No.: 33,905

[52] U.S. Cl............................. 178/66 A; 325/163
[51] Int. Cl.²...................... H04B 1/04; H04L 27/12
[58] Field of Search............ 325/30, 145, 148, 163; 328/16, 25, 30, 37, 43, 140; 178/66 A, 66 R; 331/178, 179

[56] References Cited
UNITED STATES PATENTS

| | | | |
|---|---|---|---|
| 3,031,527 | 4/1962 | Barton et al. | 178/66 |
| 3,147,442 | 9/1964 | Fritzsche et al. | 328/48 |
| 3,205,441 | 9/1965 | Likel | 178/66 R |
| 3,271,588 | 9/1966 | Minc | 325/163 |
| 3,287,648 | 11/1966 | Poole | 328/48 |
| 3,454,718 | 7/1969 | Perreault | 325/163 |
| 3,518,552 | 6/1970 | Carlow | 325/163 |
| 3,518,553 | 6/1970 | Shu-Kuang Ho et al. | 328/48 |
| 3,588,348 | 6/1971 | Bowling | 325/163 |

*Primary Examiner*—Robert L. Griffin
*Assistant Examiner*—John C. Martin
*Attorney, Agent, or Firm*—Alfred W. Barber

[57] ABSTRACT

A frequency shift generator comprises a single source of high frequency oscillations and a programmable frequency divider. Keyed mark and space input signals serve to select two predetermined divider ratios, one for the mark frequency and the other for the space frequency. The invention provides means for generating stable electrical signals of audio frequency range by means of a coherent technique, that is, one in which the phase relationship of subsequent pulses can be precisely determined.

2 Claims, 2 Drawing Figures

FIG.1

COHERENT DIGITAL FREQUENCY SHIFT KEYING SYSTEM

Frequency shift signals for communications purposes heretofore have been generated by a number of different means, the most usual of which was a free running oscillator, the frequency of which was determined by an associated inductor and capacitor. By varying either one or both of these reactive elements the frequency of oscillation can be shifted, within limits, from one frequency to another thereby encoding binary information. Such techniques, however, result in undesirable transients whenever the shift in frequency is called for by a change in the binary state of information to be transmitted. These transients are caused primarily by the fact that the phase relationship between the free running oscillator and the instant of desired frequency change are completely unrelated. Various means have been devised to overcome this deficiency which results not only in an undesirable amplitude modulation of the signal, but also because of the spurious sideband energy transmitted, a timing instability or "jitter" is observed at the receiving end. Since this timing variation is of random nature, the exact duration of information pulses cannot be precisely recovered, which results in a loss of the dependability of transmission. A commonly accepted measure of such deterioration is called "telegraph distortion" which expresses the ratio of recovered timing error to the duration of the original pulses transmitted.

Other methods have also been described in the prior art. Resistance-capacitance controlled oscillators are also presently used for the generation of frequency shift keyed signals. These can be constructed in such a way that undesirable amplitude transient as a result of instant change in information state are minimized. These devices, however, generally suffer from a lack of frequency stability because the frequency of oscillation is directly proportional to variations of either the resistive or capacitive elements of the circuit, as contrasted to the inductive/capacitive oscillator described above, in which frequency variations are proportional to the square root of the individual element values. These oscillators are therefore generally unsuitable for the generation of accurately determined and frequency shift keyed signals, i.e., in which difference between the two significant frequencies is a small percentage of the average or center frequency. Various further means have been used to improve the stability of oscillations of the above described methods, such as frequency heterodyning against a stable reference frequency, or the use of specialized temperature compensated or environmentally controlled components, which are generally difficult to construct or maintain within the prescribed limits of adjustment.

Attempts have been made in the past to take advantage of the inherent frequency stability of a piezoelectric crystal element in suitable circuits to generate high frequency pulses of oscillations. Such crystal controlled oscillators are not suitable for the generation of frequency shift signals as the frequency determining parameters of the crystal elements are not readily varied. When subjected to external reactors added to the crystal oscillator circuit, the oscillations cease before a sufficient amount of frequency change has been achieved.

A further method presently used for the generation of frequency shift keyed signals is the so called digital keying method. Unlike most previously described techniques, the means of achieving the desired frequency shift are not a result of attempts to change the frequency of oscillation, but rather digital manipulation to arrive at the exact desired output frequencies. The most commonly accepted method employs two free running oscillators, constructed to achieve maximum stability, to generate direct multiples of the desired output frequencies. A fast acting relay or electronic gating circuit selects the output of one of these two oscillators as controlled by the keying information to be encoded for transmission. In this technique, the three elements of timing, that is, the instant of change in information, and the phase relationship of the two free running oscillators are completely random with respect to each other. U.S. Pat. No. 3,271,588, describes a method by which these objectionable features are overcome. That method employs a multiplicity of binary dividers following the gate selecting the output of the two crystal controlled oscillators, which in turn reduces the resultant plus or minus 180° phase uncertainty present at the output of the said gate by a factor equal to $2^N$, where N is the number of binary dividers employed.

The present invention provides coherent, transient free frequency shift signals not hitherto available. A very stable high frequency crystal controlled oscillator provides a suitable initial source of signals. These high frequency signals are divided by two predetermined ratios to provide the desired "mark" and "space" frequencies. The two predetermined ratios are set up by a plurality of programmable dividers which are connected in forward and feedback combinations to provide the two desired output frequencies. The two ratios are controlled by two gates activated by the keying pulses, one for the mark frequency and one for the space frequency.

Figure 1:
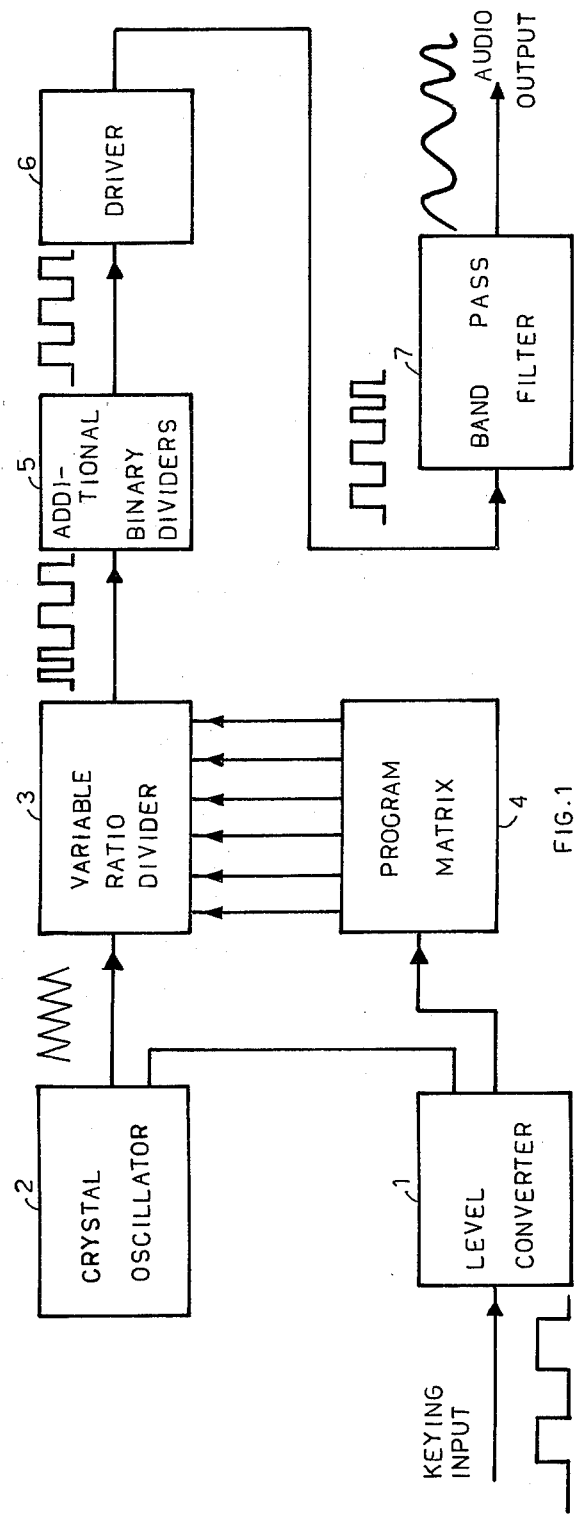
FIG. 1 is a block diagram of the preferred form of the present invention.

FIG. 1 is a simplified block diagram of the present invention in which the output of crystal oscillator 2 feeds a variable ratio divider 3. This divider is built with a multiplicity of binary elements and is contrasted with conventional binary dividers by the fact that it can be present to yield an output pulse for any given integral number of input pulses falling within its maximum capacity. This ratio of division can be altered by means of electronic circuitry as long as the desired division ratios are within an acceptable range. In this particular invention, the division ratios are governed by a program matrix 4 which has two significant states. Whichever one of these two states is rendered operational by level converter 1, thereby affecting one of two division ratios of the divider, is dependent and solely under the control of the incoming information over the input keying circuit. Thus for instance, the binary zero (or telegraph space pulse), to be transmitted as one of the frequency shift signals, can be obtained by a programmed division ratio of 15, and a binary one (or telegraph marking pulse) may be transmitted by a division ratio of 14. It is still desirable to add additional binary dividers 5 to the variable ratio divider in order to be able to keep the crystal oscillator frequency within a practical range. Furthermore, omitting or adding additional dividers provides a convenient means for extending the range of output audio frequencies by desired octaves.

Having achieved generation of the two significant frequencies of the frequency shift keyed system, means are generally required to transform the resultant square waveforms into sine waves of the desired amplitude or level for the reliable transmission of intelligence. An output driver 6 is therefore designed to bring the signals within the desired range of amplitude and a band pass filter 7 is utilized to convert the square waves to sine waves occupying a much narrower frequency spectrum. While a low-pass filter may be adequate for this purpose, it is desirable to use a band-pass filter to restrict the transmitted spectrum to minimal bandwidth in order to permit multiplexing a multiplicity of channels by means of frequency division within a single voice frequency channel.

Figure 2:
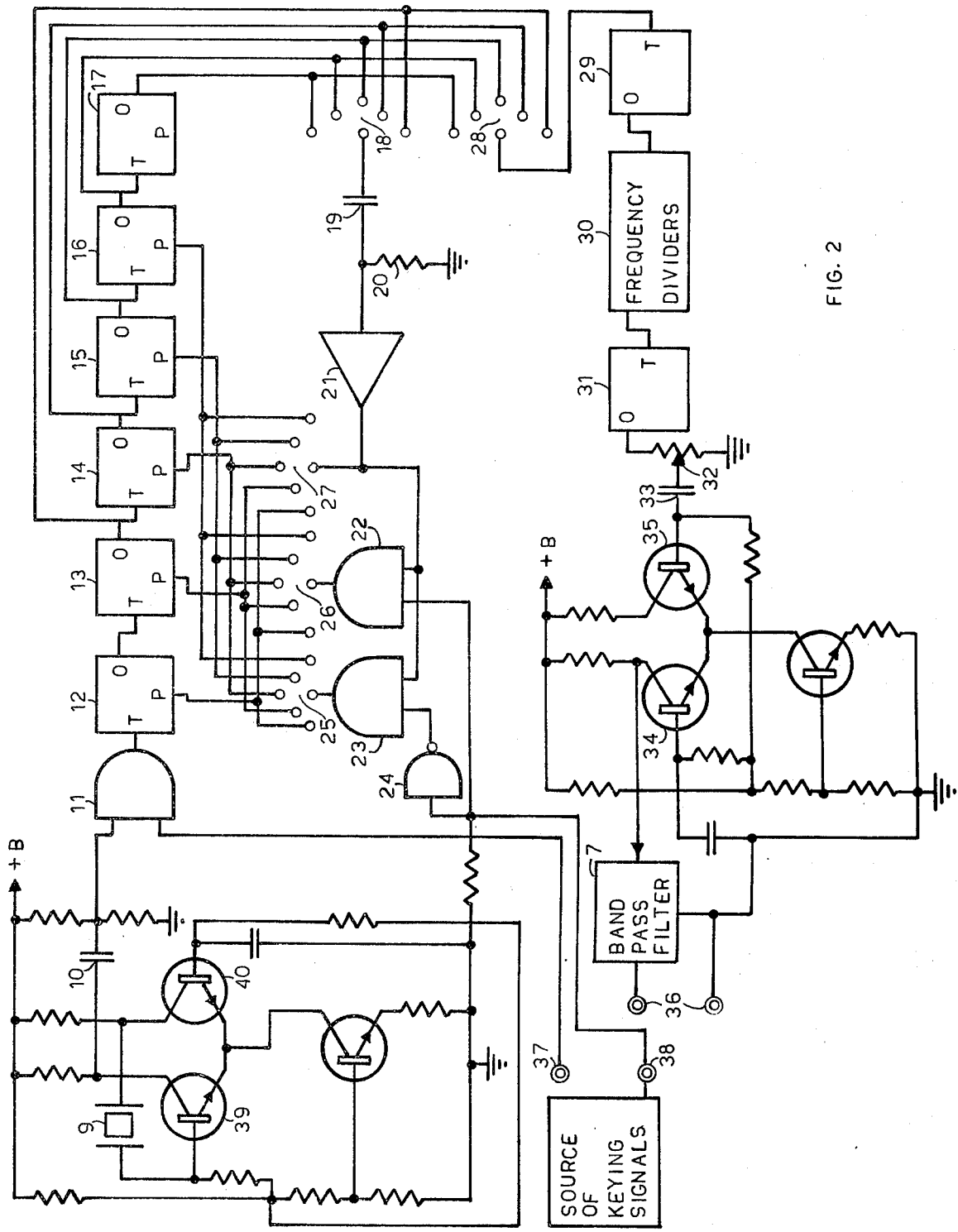
FIG. 2 is a schematic circuit diagram of the preferred form of the present invention.

The preferred embodiment of the present invention is shown in more detail in the schematic diagram of FIG. 2. The crystal oscillator 9, 10, 39, 40 is non-critical having been described in the prior art. Oscillation sustained by transistors 39 and 40 is provided at the series resonant frequency of crystal element 9. Capacitor 10 couples the pulses of oscillation to one input of the amplifier-gate 11, heavily overdriven in order to provide an output of square wave form with fast rise and fall times suitable to drive the subsequent digital circuits. Gate 11 also provides convenient means for muting the keyer by the application of a suitable control voltage to its second input at terminal 37 so that oscillation pulses are inhibited from reaching the following stages. This arrangement permits on/off keying at one of the output frequencies by applying DC keying waveform to input terminal 37. The variable ratio divider 3 (FIG. 1) is shown implemented by counter stages 12 through 17; fewer or more stages may be used depending on the desired frequency division ratios. These stages can be constructed as identical presettable flip-flop circuits. Characteristically, pulses applied to the T-input will toggle the flip-flop, that is, the circuit will change from its previous binary state every time the input signal voltage makes a unidirectional transition. Pulses applied to the preset "P" input terminals, however, will cause the flip-flop to assume a predetermined binary state regardless of its previous condition.

In the particular arrangement shown, the six flip-flop states 12 through 17 form a divide-by-64 circuit; i.e., one pulse will appear at the "0" output of stages 17 for every 64 oscillator pulses applied to the "T" input of 12 provided that there are no pulses applied to the "P" terminals of any stage.

By applying pulses to the "P" terminals of the counters, the total number of pulses needed at the input to produce one output pulse can be reduced. For example, applying one pulse to the P-terminal of first stage 12 presets the counter by one count, applying a pulse to the P-terminal of stages 13 and 15 presets these counters by 10. The number of oscillator pulses required to produce an output pulse at stage 17 thus is reduced to 63 and 54 respectively. The pulses to be applied to the P-inputs are derived from the output of one particular counter stage through the programmable pulse selector inter-connection arrangement 18. Capacitor 19 and resistor 20 are provided to differentiate the selected output pulse, converting them from non-return to zero signals to momentary impulses applied to amplifier 21. The output of amplifier 21 is a magnified version of the differentiated pulses and is suitable for application to the P-inputs of the various stages as selected through connection means 27. In order to effect a change in the ratio of division, i.e., the number of oscillator pulses required to yield an output pulse of stage 17, additional feedback pulses are coupled to the flip-flops by gates 22 and 23. One input to these gates is fed from the differentiated and amplified pulse of amplifier 21, while the other input to gates 22 and 23 is fed in push-pull by the incoming DC binary information to be encoded into frequency shift keyed signals applied at terminal 38. This signal is unipolar and inverter 24 is used to provide an opposite sense signal to that of the keying information. Gates 22 and 23 therefore are operating alternately; one permitting the preset pulses to be applied to the selected stages through the programming arrangement 25 or 26, while the other gate is simultaneously inhibited. Thus the number of stages and their respective binary count to which preset pulses are applied, are altered in accordance with the incoming keying information. By connection of the various terminals of the programming arrangements 18, 25, 26 and 27, the division ratio can be altered between any two selected numbers ranging from 3 to 64. The flexibility of such arrangement can be further extended by adding a seventh stage which expands the programming capability to a count of 128, and so on.

The particular counter arrangement shown here is not the only way possible to construct a variable ratio divider. Other types of counters such as synchronous, modulo-N and ring counters with suitable gating arrangements are included within the scope of this invention. Furthermore, the programming arrangement can be expanded to possess more than two significant states, thereby effectively generating trinary, quarternary, etc., frequency shifted signals.

Additional divider stages following the variable ratio dividers consisting of stages 29 through 31 are also customarily used. Programming arrangement 28 provides convenient means for selecting the total number of stages employed within the chain. This feature can be further expanded by making some of the additional divider stages part of the circuit or simply bypassing them when not desired. The output of the last divider stage 31 provides the desired output frequencies with the accuracy equal to that of the crystal oscillator employed. It contains no spurious amplitude modulated components and its instantaneous frequency is exactly in accordance with the incoming binary keying information applied to terminal 38. Because of the square waveform, however, it contains a significant amount of odd harmonics.

Potentiometer 32 is a convenient means of controlling the level of such output waveform to be fed through capacitor 33 to the output amplifier comprising transistors 34 and 35.

The output derived from the collector of transistor 34 is applied to the output filter 7 which removes the aforementioned high order harmonics thereby converting the square wave into a sine wave suitable from transmission through electrical networks without interference. Final output is derived from the filter at terminals 36.

To arrive at the correct crystal frequency to be employed one has to consider the two significant desired output frequencies as $F_1 = M_1 \cdot R$
$F_2 = M_2 \cdot R$ where $g$ is a common factor of the two frequencies. Then the crystal frequency can be computed by $F_x = 2^k \cdot M_1 \cdot M_2 \cdot g$ where $K$ is the number of additional divider stages employed. If the above crystal frequency is divided by the total division factor of the chain which is either $M_1 \cdot 2^k$ or $M_2 \cdot 2^k$, the output frequencies are obviously $M_2 \cdot g$ or $M_1 \cdot g$, respectively, which are equal to the desired output frequencies. For example, if these frequencies are 2800 and 2900 cycles per second, then, $F_1 = 28 \cdot 100$
$F_2 = 29 \cdot 100$
(therefore $g = 100$)
$M_1 = 28$
$M_2 = 29$.

Let us further assume that a feedback type ripple-counter arrangement such as shown on FIG. 2 is employed; then the programming of the variable ratio divider consists of connecting the preset input of stages 12 and 13 through 25 to the output of gate 23, to cause a feedback count of three; and connecting the output of gate 22 through 26 to the third stage of the counter 14 to cause a feedback count of four. No connection is to be made to 27 and capacitor 19 is to be connected through 18 to the output of the fifth stage 16. The five stage counter having a total capacity of 32 is thereby reduced by a count of three whenever gate 23 is active and 22 is inhibited, reducing the division ratio to 29. During the other significant condition gate 23 is inhibited and the pulses through gate 22 reduce the count by four to a total of 28. If we further assume seven stages of additional straight binary division ($K = 7$) then the crystal frequency $F_x = 28 \cdot 29 \cdot 100 \cdot 128 = 10,393,600$ cycles per second. Dividing this frequency by first the constant factor of $2^7 = 128$, then alternately by 28 and 29 the desired output frequencies ($F_2$ and $F_1$) are shown to appear at the output of the keyer.

While the invention has been described herein in terms of a preferred particular embodiment, many modifications will be apparent to those skilled in the art. The invention itself is not limited to the construction of that embodiment, rather, the scope of the invention is set forth in the appended claims.

I claim:

1. In a frequency shift signal generator, the combination of;

a source of stable high frequency signals;

a programmable variable ratio frequency divider coupled to said source;

programmable multicircuit selection means connected to said divider for selecting any pair of programmable divider ratios from a great plurality of possible predetermined programmable ratios;

keying signal responsive gating means coupled to said selection means for alternating said divider ratio between the two ratios comprising a selected pair in response to binary mark and space keying pulses;

means for applying keying signals to said gating means;

and output means coupled to said frequency divider.

2. In a frequency shift signal generator, the combination of;

a crystal oscillator source of stable high frequency signals;

output means;

a great plurality of programmable cascaded frequency dividing stages connected between said source and said output;

a first gatable means for programming said dividing means to provide a first predetermined frequency division ratio;

a second gatable means for programming said dividing means t porvide a second predetermined frequency division ratio;

multiposition selection means connected to said first and second gatable means for changing said first and second predetermined frequency division ratios to any other two of a plurality of predetermined frequency division ratios;

a first gate for enabling said first programming means;

a second gate for enabling said second programming means;

and keying means for actuating one of said gates in response to a binary ONE (mark) keying signal and the other of said gates in response to a binary ZERO (space) keying signal.

* * * * *